Nov. 25, 1930.  E. AYERS  1,783,032

SEED REPLANTING ATTACHMENT FOR CULTIVATORS

Filed June 23, 1928   2 Sheets-Sheet 1

Witnesses
Arthur M. Fromke.

Inventor:
Everett Ayers,
By Rummler & Rummler,
Attys.

Nov. 25, 1930.  E. AYERS  1,783,032
SEED REPLANTING ATTACHMENT FOR CULTIVATORS
Filed June 23, 1928   2 Sheets-Sheet 2
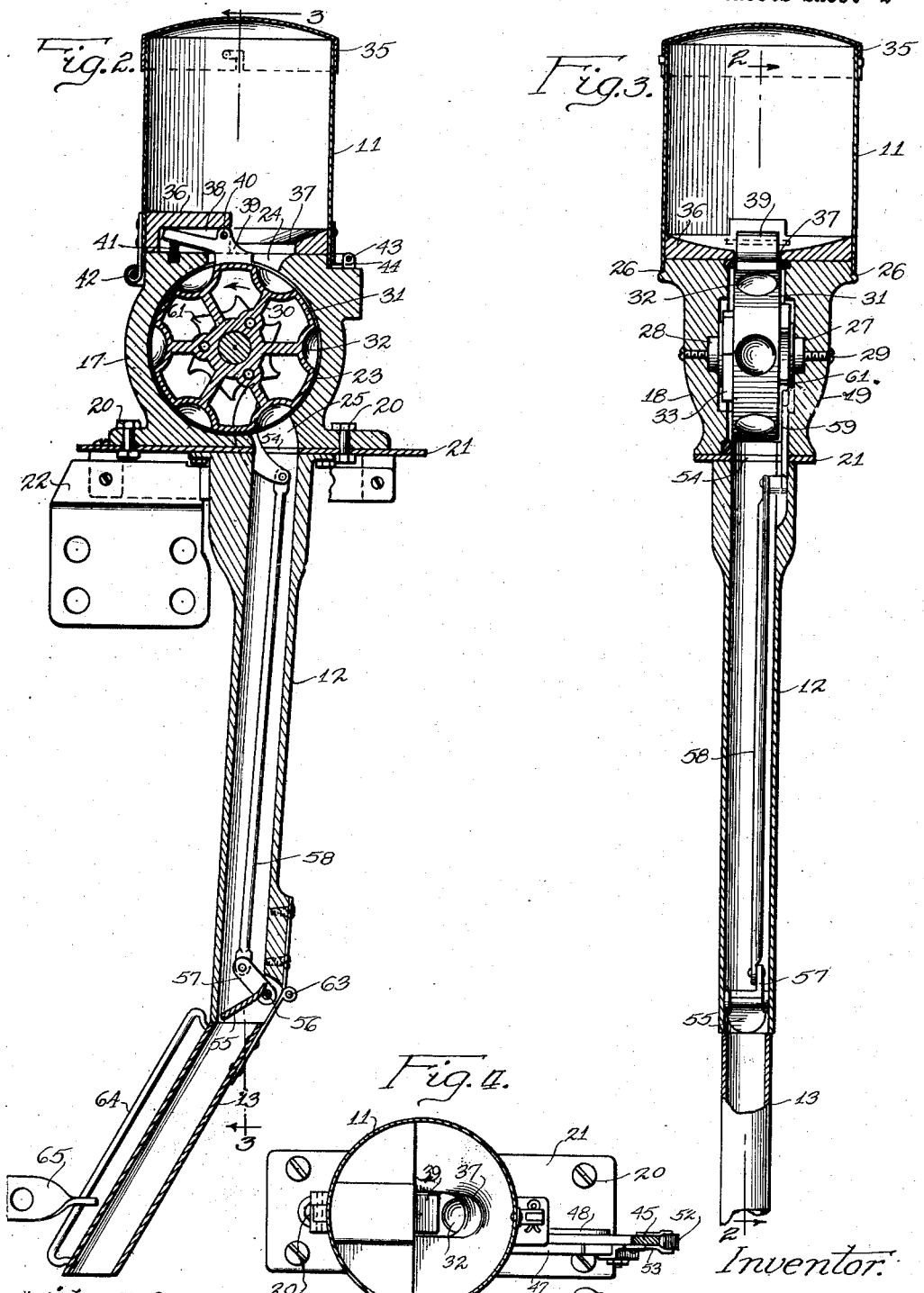

Patented Nov. 25, 1930

1,783,032

UNITED STATES PATENT OFFICE

EVERETT AYERS, OF BROOKLYN, ILLINOIS, ASSIGNOR OF ONE-THIRD TO HESTER AYERS, OF CHICAGO, ILLINOIS, AND ONE-THIRD TO JAMES AYERS, OF CAMDEN, ILLINOIS

SEED-REPLANTING ATTACHMENT FOR CULTIVATORS

Application filed June 23, 1928. Serial No. 287,774.

The main objects of this invention are to provide an improved seed planting device; to provide a planting device which is particularly adapted for attachment to a riding cultivator for use in replanting seeds such as corn, beans, pumpkins and the like; to provide a replanting device of this kind having an improved form of delivery mechanism; to provide an improved form of spout for the delivery mechanism; and to provide improved means for connecting the spout to one of the cultivator shovels.

An illustrative embodiment of this invention is shown in the accompanying drawings, wherein:—

Fig. 2 is a vertical section of the improved replanting attachment, the view being taken on the line 2—2 of Fig. 3.

Fig. 3 is a vertical section, taken on the line 3—3 of Fig. 2.

Fig. 4 is a transverse section, taken on the line 4—4 of Fig. 5.

Figure 1:
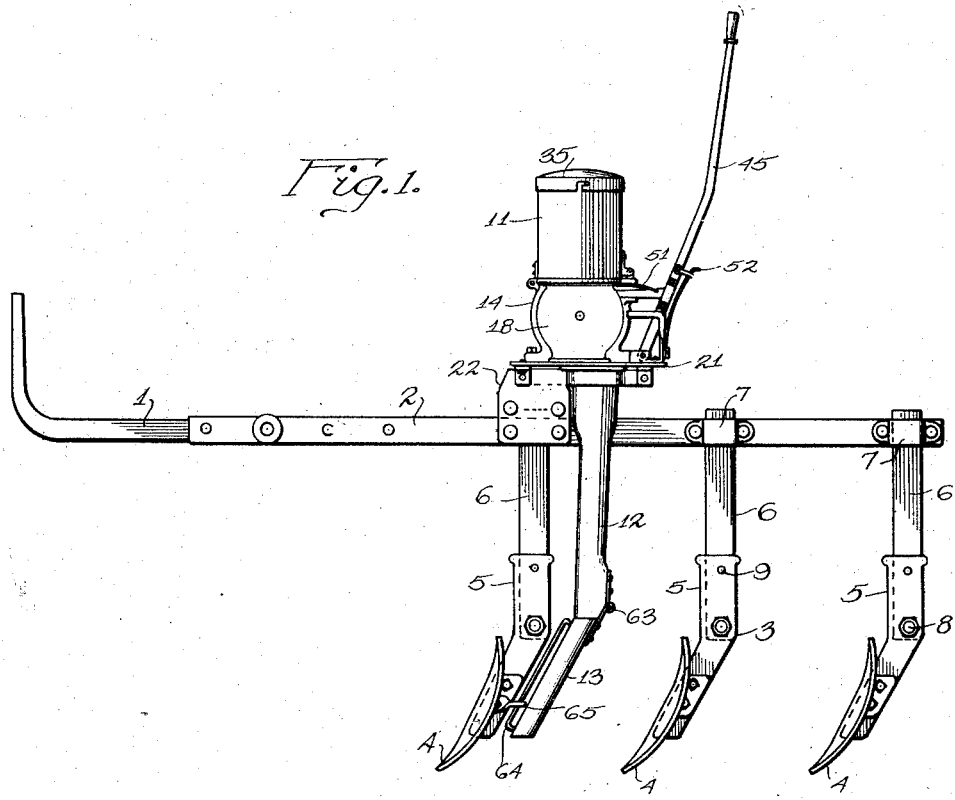
Figure 1 is a fragmentary side elevation of a cultivator having an improved replanter attached thereto.
Figure 5:
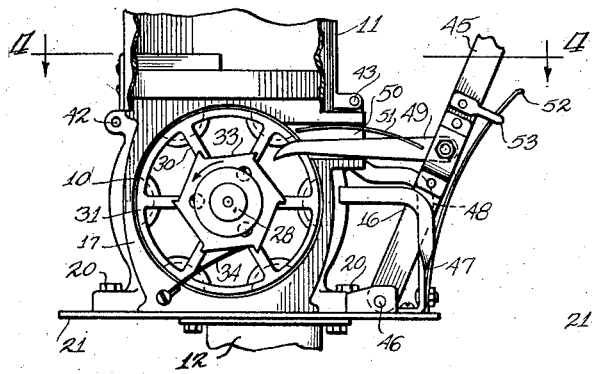
Figs. 5 and 6 are fragmentary side elevations of the delivery mechanisms, taken from the left and right respectively of Fig. 3, and certain parts being omitted or broken away for the sake of clearness.
Figure 6:
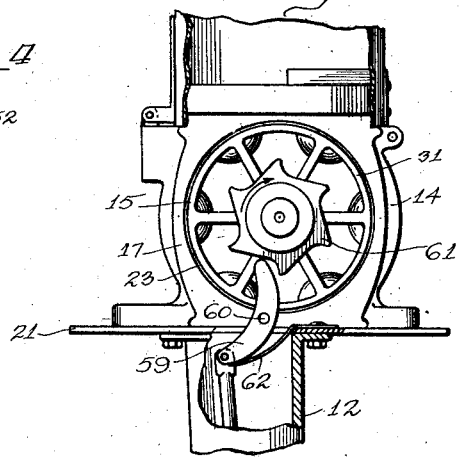

The improved replanting device, to which this invention is applied, is adapted for attachment to a riding cultivator in a position directly behind one of the shovels and is provided with operating means located in a position convenient to the operator, so as to be adapted for operation during the movement of the cultivator.

Inasmuch as this invention relates primarily to the replanting attachment, only that portion of a cultivator believed necessary to a complete understanding of the invention has been illustrated in the drawing.

In the form shown, the cultivator is of the riding type and includes a beam 1, which is bifurcated to provide a pair of supports 2, only one of which is shown, on which a plurality of shovels 3 is mounted.

Each of the shovels 3 comprises a blade 4 fixed on a bracket 5, which is supported on an arm 6 secured to the beam part 2 by a clamp 7.

The bracket 5 is in the form of a bell crank, which is mounted on a pivot pin 8. The lower arm of the bracket 5 carries the shovel 4 and the upper arm is substantially U-shaped in cross section and embraces the leg 6. The bracket 5 is normally secured against angular movement on its pin 8 by means of a wooden peg 9 extending through the leg 6 and the upper arm of the bracket.

When any of the shovels strikes a heavy obstruction, the peg 9 is sheared to permit the blade 4 to move rearwardly to avoid injury to the cultivator.

In the construction illustrated, the improved replanting attachment comprises a feeding mechanism 10 adapted to receive seeds from a magazine 11 and to deliver them in groups or charges to a chute 12, in which each charge is stored preparatory to its ejection through a spout 13

In the form shown, the feeding mechanism 10 comprises a housing 14, in which is mounted a conveyer drum 15, adapted to be rotated in a step-by-step movement by improved operating mechanism 16.

The housing 14 is preferably made in three sections including a central casing 17 and a pair of side wall sections 18 and 19. Extending through the base of the casing 17, are screws 20 for securing the housing to a supporting plate 21 mounted on a bracket 22 which is secured to the cultivator beam as illustrated in Fig. 1.

Formed in the casing 17, is a centrally located cylindrical opening 23 in which the conveyer drum is located. Formed in the top and bottom of the casing, is an inlet opening 24 and an outlet 25 communicating, respectively, with the magazine 11 and chute 12.

In the construction illustrated, the side wall sections 18 and 19 are mounted on the supporting plate 21 and the upper faces thereof are provided with arcuate ledges 26 for supporting the magazine 11. Formed in the inner faces of the sections 18 and 19, are recesses 27, in which are seated the ends of a shaft 28, upon which the drum 15 is rotatably mounted. The side sections 18 and 19 are secured to the shaft 28 by screws 29.

The conveyer drum 15 comprises a spider 30, rotatably mounted on the shaft 28 and having a rim 31 provided with a plurality of pockets 32, each of which is adapted to carry a charge of seeds from the opening 24 to the opening 25.

Fixed on one side of the spider 30, is a ratchet 33 which is restrained against backward movement by a detent 34 mounted on the casing part 17. The ratchet 33 is rotated step-by-step by the improved operating mechanism 16.

The magazine 11 is provided with a removable lid 35 and a bottom 36, which is inclined adjacent an outlet opening 37.

Formed in the bottom member 36, is a recess 38 in which is located a shoe 39 pivotally secured to a pin 40. One end of the shoe 39 is adapted to ride on the rim 31 of the conveyer drum to level the seeds in the pockets 32. The shoe 39 is yieldingly urged into engagement with the drum by a spring 41 bearing between the opposite end of the shoe and the top of the casing 17.

The magazine is hinged at one side to a pin 42 mounted on the casing 17. Mounted on the opposite side of the magazine, is a bolt 43 for engaging an eyelet 44 on the casing 17.

In the form shown, the operating mechanism 16 includes a manually operable lever arm 45, having its lower end pivotally connected to the supporting plate 21 by a pin 46. The lever 45 is slidable between a pair of guide rails 47 and 48 secured to the casing 17 and support 21.

Pivotally mounted on the lever 45, is a pawl 49 extending through a slot 50 in the casing 17 for engagement with the ratchet 33 of the conveyer drum. The pawl 49 is normally urged downwardly into position to engage the ratchet by means of a spring 51, which is mounted on the upper edge of the pawl and which bears against the upper edge of the slot 50.

The lever 45 is normally held in a retracted position by a spring 52 mounted on the base plate 21 and extending through a guide 53 on the lever 45.

In the form shown the chute 12 is secured to the lower face of the support 21 and communicates at its upper end with the opening 25 through an opening 54 in the support 21. Mounted in the lower end of the chute 12, is a gate 55 adapted to temporarily support a charge of seeds preparatory to its ejection.

The gate 55 is hinged on a pin 56 and has an arm 57 pivotally secured to the lower end of a link 58 extending upwardly within the chute.

The upper end of the link 58 is pivotally secured to a bell crank 59, secured to the casing 17 by a pivot pin 60. The upper end of the bell crank 59 engages a rotary cam 61, which is fixed on the spider 30 opposite the ratchet 33. The cam 61 rotates step-by-step with the drum 15 under the action of the lever 45 for rocking the bell crank 59 and thereby forcing the link 58 downwardly to open the gate 55.

Mounted in the upper end of the chute 12, is a spring 62 engaging the lower end of the bell crank 59 for raising the link 58 to normally close the gate 55.

In the form shown the spout 13 is located directly behind one of the cultivator shovels 3, so as to be adapted to deposit the seeds in the furrow made by the blade 4. In order to avoid injury to the spout, in the event the wooden peg 9 is sheared, the spout is hinged to the chute 12 by a hinge 63.

Mounted on the front part of the spout 13, is a guide rail 64, which engages a link member 65 rigidly secured to the shovel bracket 5 for normally holding the spout in a forwardly inclined position as shown in Fig. 2.

In operation, the riding cultivator is operated in the usual manner, so as to straddle the row of corn. When the operator sees that the seeds in any hill have not sprouted, at the moment the foremost shovel approaches the barren hill, the lever 45 is shifted forwardly to move the conveyer drum one step and simultaneously open the gate 55. The seeds in the chute 12 thereupon drop through the spout 13 into the furrow behind the cultivator shovel.

Upon each movement of the conveyer drum, a charge of seeds is taken from the magazine 11 and another charge is dropped into the chute 12 to replace the charge ejected through the spout 13.

Although but one specific embodiment of this invention has been herein shown and described, it will be understood that details of the construction shown may be altered or omitted without departing from the spirit of this invention as defined by the following claims.

I claim:

1. In a seed planter for cultivators having a yieldable inclined shovel, a seed magazine having an outlet therein, a vertically disposed chute communicating with said outlet, means in said magazine for feeding measured quantities of seeds from said outlet to said chute, a gate hinged at the lower end of said chute on a horizontal axis for retaining a measured quantity of seed therein ready for discharge, a vertically movable rod located within said chute, the lower end of said rod being connected to said gate, the upper end of said rod being arranged to be actuated by said feeding means, a discharge spout hinged on the lower end of said chute on a horizontal axis, and means connecting said chute and spout for retaining said spout in an inclined position with its discharge end in close proximity to said shovel so as to deposit seeds immediately in back of said shovel.

2. A seed planter comprising a magazine, a conveyor comprising a drum having recesses therein arranged to receive seed from said magazine, a chute having an inlet in registration with said drum adapted to receive seed from one of said recesses at a time, a movable gate hinged at the lower end of said chute for retaining a charge of seeds ready for discharge, a vertically movable rod located within said chute and connected with said gate for opening and closing the same, a cam on said drum arranged to depress said for rod opening said gate before each successive recess deposits its charge of seeds into the inlet of said spout, a spring normally raising said rod, and an operating handle for rotating said drum.

3. A seed planter comprising a hopper having an outlet in its lower end, a drum rotatably mounted on a horizontal axis below said outlet and having peripheral pockets for receiving seeds from said hopper, a vertical tubular chute suspended below said drum in position to receive seeds from said pockets, a gate hinged in the lower end of said chute for supporting a charge of seeds, a vertically movable rod located within said chute and connected to said gate, a lever pivotally mounted at the upper end of said chute, one end of said lever being connected to said rod, a spring bearing against said lever for normally raising said rod to close said gate, and a rotary cam mounted on said drum in position to engage the other end of said lever for depressing said rod intermittently during rotation of said drum.

Signed at Brooklyn this 19th day of June, 1928.

EVERETT AYERS.